United States Patent
Fu et al.

(10) Patent No.: US 9,238,742 B2
(45) Date of Patent: Jan. 19, 2016

(54) METHOD OF PREPARING UV-CURABLE INKJET PIGMENT INK FOR TEXTILE PRINTING

(71) Applicants: Shaohai Fu, Wuxi (CN); Yu Guan, Wuxi (CN); Anli Tian, Wuxi (CN); Xia Zhang, Wuxi (CN); Chunxia Wang, Wuxi (CN); Chaoxia Wang, Wuxi (CN)

(72) Inventors: Shaohai Fu, Wuxi (CN); Yu Guan, Wuxi (CN); Anli Tian, Wuxi (CN); Xia Zhang, Wuxi (CN); Chunxia Wang, Wuxi (CN); Chaoxia Wang, Wuxi (CN)

(73) Assignee: Jiangnan University, Wuxi, JS (CN)

( * ) Notice: Subject to any disclaimer, the term of this patent is extended or adjusted under 35 U.S.C. 154(b) by 0 days.

(21) Appl. No.: 14/463,660

(22) Filed: Aug. 20, 2014

(65) Prior Publication Data

US 2015/0111981 A1    Apr. 23, 2015

(30) Foreign Application Priority Data

Oct. 18, 2013   (CN) .......................... 2013 1 0494969

(51) Int. Cl.

| | |
|---|---|
| C08F 2/50 | (2006.01) |
| C08F 2/46 | (2006.01) |
| B29C 71/04 | (2006.01) |
| A61L 2/08 | (2006.01) |
| A61L 24/00 | (2006.01) |
| C08G 61/04 | (2006.01) |
| C09D 11/322 | (2014.01) |
| C09D 125/14 | (2006.01) |
| C09D 133/12 | (2006.01) |
| C09D 109/00 | (2006.01) |
| C09D 133/10 | (2006.01) |
| C08K 5/42 | (2006.01) |
| C08K 5/22 | (2006.01) |
| C08K 5/3437 | (2006.01) |
| C08K 5/3417 | (2006.01) |

(52) U.S. Cl.
CPC ................ *C09D 11/322* (2013.01); *C08K 5/22* (2013.01); *C08K 5/3417* (2013.01); *C08K 5/3437* (2013.01); *C08K 5/42* (2013.01); *C09D 109/00* (2013.01); *C09D 125/14* (2013.01); *C09D 133/10* (2013.01); *C09D 133/12* (2013.01)

(58) Field of Classification Search
USPC ............. 522/39, 33, 6, 1, 71, 189, 184; 520/1
See application file for complete search history.

(56) References Cited

U.S. PATENT DOCUMENTS

2005/0075416 A1* 4/2005 Miyabayashi ................ 523/160

OTHER PUBLICATIONS

Zundong Liu. "Study on Ink-Jetting Properties of Water-Based Ultra-Fine Pigment Dispersions." Chinese Master's Theses Full-text database, Engineering Sciences and Technology I, 2010, vol. 5, B018-3.
Changxi Qin. "Market and Development of UV Curable Inkjet Technology." Information Recording Materials, 2008, vol. 9, No. 5, p. 28-34.

* cited by examiner

Primary Examiner — Ling Choi
Assistant Examiner — Jessica E Whiteley
(74) Attorney, Agent, or Firm — Lili Chen

(57) ABSTRACT

The present invention provides a method of preparing UV-curable inkjet pigment ink for textile printing, in which mini-emulsion techniques are used to encapsulate monomer, photo initiator, thermal initiator and pigment in mini-emulsion particles to make a UV-curable pigment paste, and the UV-curable pigment paste is mixed with water-soluble co-solvent, surfactant and water to make a UV-curable pigment ink. The preparation process is simple and easy. The UV-curable inkjet pigment ink of the invention exhibits good fluency during printing, bright color and strong color fastness in printed products.

12 Claims, No Drawings

METHOD OF PREPARING UV-CURABLE INKJET INK FOR TEXTILE PRINTING

CROSS-REFERENCES AND RELATED APPLICATIONS

This application claims the benefit of priority to Chinese Application No. 201310494969.4, entitled "A method of preparing UV-curable inkjet pigment ink for textile printing", filed Oct. 18, 2013, which is herein incorporated by reference in its entirety.

BACKGROUND OF THE INVENTION

1. Field of the Invention

The present invention relates to the field of fine chemicals and material science, and more particularly relates to a method of preparing UV-curable inkjet pigment ink for textile printing.

2. Description of the Related Art

Compared with the traditional textile printing technology, inkjet printing has many advantages. For instance, it is more suitable for small quantity and multi-species printing, and it can print in a wide spectrum of colors. As ink is a key consumable in textile digital printing, the research and development of the textile printing ink is very important for the application and advancement of textile digital printing. Compared to dye inks, textile inkjet printing with pigment ink has increased exponentially over the past years due to its numerous advantages, such as universal applicability to different textile substrates, reduction of water and energy expense, and most importantly, environmental friendliness.

The size and distribution of pigment particles is one of many factors that determines the quality of pigment ink. Big pigment particles can easily block the printer nozzle, and may cause serious diffuse reflection on the surface of textile, which adversely effects the brightness of printed textile. Different from paper printing, textile printing requires higher degree of rubbing and washing colorfastness. In order to increase colorfastness, a certain amount of binders are often added into the pigment ink to improve the adhesion of pigment to textiles. However, the presence of binders easily leads to deterioration of the ink fluency. To address the above problems in pigment ink, researchers worldwide have proposed many possible solutions. For example, Chinese patent CN103052694A discloses a method for preparing thermal inkjet printing pigment by mixing the pigment and polyurethane; China CN102847497A patent discloses a method of using pigment microcapsules to coat the surface of pigment so as to change their surface charge and improve the stability of water-based ink; Chinese patent Nos. CN1982383 and CN1850921 disclose a method for preparing an inkjet ink using nanoscale pigment capsules; Chinese patent No. CN102926224A discloses a method of using polymerizable dispersant and miniemulsion ink polymerization process to prepare an ink-jet pigment ink which requires no additional binder; U.S. Patent Nos. US005554739A and US006042643A provide a method of introducing a reactive functional group to the pigment surface to improve the colorfastness of the ink. US70301175 and U.S. Pat. No. 7,338,988 discloses a method of adding polyacrylate emulsion to aqueous pigment to improve the colorfastness of the inject pigment ink to PE, PVC, PU and other plastic material. However, the colorfastness problem is still yet to be fully solved.

UV-curable pigment ink is a novel pigment ink and its application in textile printing has gained worldwide attention. It offers many benefits such as energy saving, no solvent emissions, low pollution to the environment, high productivity and good color fastness. UV-curable ink is mainly composed of UV-curable resin, reactive diluents, photo initiators, colorants, additives and other components. Previous study of mini-emulsion polymerization reaction found that the monomer conversion rate is about 81% when using oil-soluble initiator to prepare mini-emulsion pigment particles. The presence of remaining monomer or oligomer in the pigment ink could be one reason that adversely affects the colorfastness. To increase the monomer conversion rate and improve the colorfastness, we combined thermal polymerization reagents, UV-curable reagents and mini-emulsion polymerization process to make a UV-curable pigment ink. First, monomers, photo initiators and thermal initiators are mixed with pigment particles to make a UV-curable pigment mini-emulsion paste. Secondly, the pigment paste is mixed with a water-soluble cosolvent, a non-ionic surfactant and other additives to obtain a UV-curable inkjet pigment ink. The results show that the UV-curable inkjet pigment ink of the invention has greatly improved the colorfastness.

DETAILED DESCRIPTION

The object of the present invention is to provide a method for preparing a UV-curable inkjet pigment ink. The method comprises making a UV-curable pigment paste via mini-emulsion polymerization and sequentially adding a water-soluble co-solvent, a nonionic surfactant and other additives to the pigment paste to obtain final product of UV-curable inkjet pigment ink. The method uses both thermal initiators (for heat-based polymerization) and photo initiators (for UV-based polymerization) to make a pigment ink that exhibits good fluency in printing and great color fastness in printed products. Monomers undergo heat-initiated partial polymerization during the preparation of pigment paste. After printing the pigment ink onto the substrate, UV light is used to initiate the complete polymerization reaction and make the pigment firmly attached to the printing substrate. The method is simple to operate and produces a UV-curable pigment ink with good fluency and colorfastness.

In one embodiment, the invention provides a method for preparing UV-curable inkjet pigment ink, comprising mixing 30-60% (w/w) UV-curable pigment paste, 10-50% (w/w) water-soluble co-solvent, (w/w) 0.5-5% surfactant and deionized water under 500-1000 rpm for 10-60 min to make a UV-curable pigment dispersion; adjusting the pH value of the dispersion to 8-10 and filtering the dispersion through a filtering sieve with a pore size of 500 nm to obtain the UV-curable pigment ink.

In a preferred embodiment, the UV-curable pigment paste is prepared by miniemulsion polymerization. 30-150% (w/w: monomer/pigment) monomer, 0.1-5% (w/w: co-emulsifier/monomer) co-emulsifier, 0.1-5% (w/w: thermal initiator/monomer) thermal initiator and 0.1-5% (w/w: photo initiator/monomer) photo initiator are mixed together to obtain phase A. 10-50% (w/w: pigment/pigment paste) pigment and 10-50% (w/w: dispersant/monomer) dispersant are mixed with deionized water, which makes up to 100% pigment paste, to obtain phase B. The phase A is added dropwisely into phase B under mechanical stirring to get a coarse emulsion. The coarse emulsion was further homogenized for 10-120 min using bead mill homogenizer or ultrasonic cell grinding machine to prepare the miniemulsion with particle size of 50-500 nm. The miniemulsion is placed in a four-neck round bottle, in which the air has been replaced by nitrogen, and incubates for 1-24 hours at 60-80° C. with continuous stiffing (250-600 rpm). The reaction product is filtered through a 500 nm pore-size filtering sieve to obtain the pigment paste.

The pigment can be chosen from inorganic and organic pigments. In a preferred embodiment, the pigment is one or more pigment(s) chosen from the group consisting of carbon black, C. I. Pigment Yellow 1, C. I. Pigment Yellow 3, C. I. Pigment Yellow 12, C. I. Pigment Yellow 13, C. I. Pigment Yellow 14, C. I. Pigment Yellow 34, C. I. Pigment Yellow 36, C. I. Pigment Yellow 65, C. I. Pigment Yellow 74, C. I. Pigment Yellow 81, C. I. Pigment Yellow 83, C. I. Pigment Orange 13, C. I. Pigment Orange 16, C. I. Pigment Orange 34, C. I. Pigment Red 3, C. I. Pigment Red 8, C. I. Pigment Red 21, C. I. Pigment Red 7, C. I. Pigment Red 23, C. I. Pigment Red 38, C. I. Pigment Red 48:2, C. I. Pigment Red 48:4, C. I. Pigment Red 49:1, C. I. Pigment Red 52:2, C. I. Pigment Red 57:1, C. I. Pigment Red 63:1, C. I. Pigment Red 64:1, C. I. Pigment Red 81, C. I. Pigment Red 88, C. I. Pigment Red 92, C. I. Pigment Red 101, C. I. Pigment Red 104, C. I. Pigment Red 105, C. I. Pigment Red 106, C. I. Pigment Red 108, C. I. Pigment Red 112, C. I. Pigment Red 122, C. I. Pigment Red 123, C. I. Pigment Red 146, C. I. Pigment Red 149, C. I. Pigment Red 166, C. I. Pigment Red 168, C. I. Pigment Red 170, C. I. Pigment Red 172, C. I. Pigment Red 185, C. I. Pigment Red 190, C. I. Pigment Red 209, C. I. Pigment Red 219, C. I. Pigment Blue 1, C. I. Pigment Blue 15:1, C. I. Pigment Blue 15:3, C. I. Pigment Blue 15:4, C. I. Pigment Blue 15:6, C. I. Pigment Blue 16, C. I. Pigment Blue 17:1, C. I. Pigment Blue 56, C. I. Pigment Blue 61, C. I. Pigment Blue 63 and C. I. Pigment Purple 19.

In another preferred embodiment, the monomer is one or two chemicals chosen from the group consisting of butadiene, isoprene, dicyclopentadiene, styrene, butyl acrylate, ethyl acrylate, methyl acrylate, methyl methacrylate, ethyl methacrylate, butyl methacrylate, vinyl acetate and methyl vinyl ether and acrylonitrile.

In another preferred embodiment, the thermal initiator is chosen from the group consisting of azobisisobutyronitrile (AIBN), benzoperoxide (BPO), tert-butyl hydroperoxide (TBHP) and tert-butyl perbenzoa (GYHB).

In a preferred embodiment, the photo initiator is chosen from the group consisting of 1-hydroxy phenylcyclohexyl ketone, 2-methyl-1-[4-(methylthio)phenyl]-2-morpholinopropanone, isopropylphenyl-2-hydroxy-2-methylacetone, 2-hydroxy-2-methyl-1-phenyl-1-acetone and diphenyl(2,4,6-trimethylbenzoyl)phosphine oxide.

In a preferred embodiment, the dispersant includes anion surfactant, non-ionic surfactant and reactive surfactant. For example, the anion surfactant is selected from sodium dodecyl sulfate, sodium dodecyl sulfonate, sodium dodecyl benzene sulfonate, potassium oleate, sodium alkylnaphthalenesulfonate, or sodium abietate. The non-ionic surfactant is selected from polyoxyethylene alkyl phenol condensation compounds including OP-7, OP-10 and OP-15; Polyoxyethylene fatty alcohol condensates including Peregal O-10, Peregal O-20, Peregal O-25 and Peregal A-20; Polyoxyethylene polyol ether fatty acid esters including Tween® 40, Tween® 60, Tween® 65 and Tween® 80; Fatty acid polyoxyethylene condensates such as SG-10 and SE-10. The reactive surfactant includes, for example, ammonium sulfateallyloxy nonylphenoxy poly(ethyleneoxy) (10) ether (DNS-86).

In another preferred embodiment, the co-emulsifier is one or more chemicals selected from the group consisting of hexadecane (HD), cetyl alcohol (CA), solvothermal (DDM), octadecanethiol, hydrophobic alkyd resin, vinylsiloxane rubber, twelve alkyl esters of methacrylic acid, octadecyl methacrylate, polyvinyl acetate, polystyrene, poly(methyl methacrylate).

In another preferred embodiment, the water-soluble co-solvent is one or two chemicals selected from the group consisting of ethanol, n-propyl alcohol, isopropanol, n-butyl alcohol, ethanediol, 1,3-propylene glycol, 1,4-butanediol, 1,6-hexanediol, diethylene glycol, triethyleneglycol, tetraethylene glycol, poly(ethylene glycol) 200, poly(ethylene glycol) 400, poly(ethylene glycol) 600, glycerol, pentaerythritol.

In another preferred embodiment, the surfactant is one or more chemicals selected from the group consisting of polyoxyethylene alkyl ethers such as Tween® 40, Tween® 60, Tween® 65, Tween® 80, Triton™ X-100 and Triton™ X-10; polyoxyethylene esters such as Span® 20, Span® 40, Span® 60 and Span® 80; polyoxyethylene alkyl phenol condensates such as Peregal O-10, Peregal O-25 and Peregal A-20.

The present invention provides a method of making a UV-curable pigment ink, which combines heat-based and UV-based polymerization with mini-emulsion techniques to make a UV-curable inkjet pigment ink that has a high monomer conversion rate (>90%) and exhibits good fluency and color fastness. The method is easy and simple to operate, yet can produce high quality pigment ink.

EXAMPLES

Materials and Methods

The particle size was determined by the method of dynamic light scattering (DLS) using a Malvern Zetasizer Nano ZS90 instrument at 25° C.

The viscosity was measured using Brookfield DV-III at 25° C. with a shear rate of 30 s$^{-1}$. The surface tension was measured by using the ring method in Drop Shape Analysis System DSA100.

The color fastness to rubbing and washing was evaluated according to the standard methods of GB/T 3921-2008 and GB/T3922-1995, respectively.

Example 1

Preparation of the UV-curable pigment paste: 5 g styrene, 5 g ethyl acrylate, 0.1 g hexadecane, 0.05 g AIBN and 0.05 g diphenyl(2,4,6-trimethylbenzoyl)phosphine oxide were mixed to obtain phase A. 1 g sodium dodecyl benzene sulfonate was dissolved in 78.8 g deionized water to obtain a water solution. 10 g C. I. Pigment Yellow 13 was added to the sodium dodecyl benzene sulfonate solution with continuous stiffing. The pigment solution was grinded for 30 min to obtain phase B. The phase A was added dropwisely into the phase B under a mechanical stirrer to get a coarse emulsion and the coarse emulsion was sonified for 10 min to prepare O/W (Oil-in-Water) miniemulsion. The miniemulsion was placed in a four-neck round bottle in which the air has been replaced by nitrogen and incubated for 24 hours at 60° C. with continuous stirring (600 rpm). The reaction product was filtered through a 500 nm pore size filtering sieve to obtain the UV-curable pigment paste.

The UV-curable pigment ink was prepared by the following steps: first, 50 g pigment paste, 3 g ethanol, 15 g pentaerythritol, 10 g glycol, 10 g glycerol, 1 g isopropanol, 2 g Tween 20 and 9 g deionized water were mixed with continuous stirring (500 rpm) for 30 min to get a homogeneous dispersion. Second, the pH value of the dispersion was adjusted to 10 by NaOH. Finally, the dispersion was filtered to obtain the pigment ink. The surface tension (σ), viscosity (η), pigment particle size (d) and Zeta potential (ξ) of the pigment ink were 28.6 mN/m, 7.67 cP, 180.4 nm and −26.7 mV, respectively. The textile samples were printed using inkjet printing machine and dried at 60° C. The samples were then irradiated with UV light (365 nm) for 40 s. The color fastness to rubbing was presented in Table 1.

Example 2

Preparation of the pigment paste: 20 g methyl methacrylate, 10 g butyl methacrylate, 1.5 g hexadecanol, 0.5 g BPO and 1.5 g 1-hydroxy phenylcyclohexyl ketone were mixed to obtain phase A. 9 g OP-10 was dissolved in 37.5 g water to obtain a water solution. 20 g C. I. Pigment Red 122 was added to the OP-10 solution with continuous stirring. The pigment solution was then grinded for 60 min to obtain phase B. The phase A was added dropwisely into the phase B under a mechanical stirrer to get a coarse emulsion and the coarse emulsion was sonified for 120 min to prepare O/W miniemulsion. The miniemulsion was placed in a four-neck round bottle in which the air was replaced by nitrogen and incubated for 2 hours at 80° C. with continuous stirring (500 rpm). The reaction product was filtered through a 500 nm pore-size filtering sieve to obtain the pigment paste.

The UV-curable pigment ink was prepared by the following steps: first, 30 g pigment paste, 5 g 1,4-butyl glycol, 20 g pentaerythritol, 10 g 1,6-hexanediol, 10 g glycerol, 5 g isopropanol, 1 g Triton X-100 and 19 g deionized water were mixed with continous stirring (600 rpm) for 60 min to get a homogeneous dispersion. Second, the pH value of the dispersion was adjusted to 8.9 by NaOH. Finally, the dispersion was filtered to obtain the ink. The surface tension ($\sigma$), viscosity ($\eta$), pigment particle size (d) and Zeta potential ($\xi$) of the ink were 33.1 mN/m, 6.35 cP, 150.3 nm and −29.2 mV, respectively. The textile samples were printed using an inkjet-printing machine and the UV-curable pigment ink made above. The samples were then dried at 60° C. and irradiated with UV light (365 nm) for 40 s. The color fastness to rubbing was presented in Table 1.

Example 3

Preparation of the pigment paste: 10 g isoprene, 5 g butyl acrylate, 0.02 g dodecyl mercaptan (DDM), 0.75 g TBHP and 0.4 g 2-methyl-1-[4-(methylthio)phenyl]-2-morpholinopropanone were mixed to obtain phase A. 7.5 g Tween 80 was dissolved in 26.33 g water to obtain a water solution. 50 g C. I. Pigment Blue 15:4 were added to the Tween 80 solution with continuous stirring. And then, the pigment solution was grinded for 120 min to obtain phase B. The phase A was added dropwisely into the phase B under a mechanical stirrer to get a coarse emulsion and the coarse emulsion was sonified for 40 min to prepare an O/W miniemulsion. The miniemulsion was placed in a four-neck round bottle in which the air has been replaced by nitrogen and incubated for 5 hours at 75° C. with continuous stirring (250 rpm). The reaction product was filtered through a 500 nm pore-size filtering sieve to obtain the pigment paste.

The UV-curable pigment ink was prepared by the following steps: first, 40 g pigment paste, 7 g n-butyl alcohol, 14 g pentaerythritol, 12 g triethyleneglycol, 6 g glycerol, 3 g isopropanol, 0.5 g Span 40 and 17.5 g deionized water were mixed with continuous stirring (750 rpm) for 20 min to get a homogeneous dispersion. Second, the pH value of the dispersion was adjusted to 9.4 by NaOH. Finally, the dispersion was filtered to obtain the ink. The surface tension ($\sigma$), viscosity ($\eta$), pigment particle size (d) and Zeta potential ($\xi$) of the ink were 31.9 mN/m, 4.93 cP, 171.8 nm and −34.5 mV, respectively. The textile samples were printed using inkjet-printing machine and dried at 60° C. And then the samples were irradiated with UV light (365 nm) for 40 s. The color fastness to rubbing was presented in Table 1.

Example 4

Preparation of the pigment paste: 5 g ethyl methacrylate, 10 g ethyl acrylate, 0.3 g dodecane, 0.05 g GYHB and 0.5 g 2-hydroxy-2-methyl-1-phenyl-1-acetone were mixed to obtain phase A. 4 g ammonium sulfateallyloxy nonylphenoxy poly(ethyleneoxy) (10) ether (DNS-86) was dissolved in 50.15 g water to obtain a water solution. 30 g C. I. Pigment Purple 19 was added to the solution with continuous stirring. And then, the pigment solution was grinded for 45 min to obtain phase B. The phase A was added dropwisely into the phase B under a mechanical stirrer to get a coarse emulsion and the coarse emulsion was sonified for 10 min to prepare O/W miniemulsion. The miniemulsion was placed in a four-neck round bottle in which the air has been replaced by nitrogen and incubated for 1 hour at 80° C. with continuous stirring (400 rpm). The reaction product was filtered through a 500 nm pore-filtering sieve to obtain the pigment paste.

The UV-curable pigment ink was prepared by the following steps: first, 60 g pigment paste, 4.5 g ethanol, 1 g pentaerythritol, 2 g glycol, 1.5 g glycerol, 1 g isopropanol, 5 g Peregal A-20 and 25 g deionized water were mixed with continuous stirring (1000 rpm) for 15 min to get a homogeneous dispersion. Second the pH value of the dispersion was adjusted to 9.8 by NaOH. Finally, the dispersion was filtered to obtain the ink. The surface tension ($\sigma$), viscosity ($\eta$), pigment particle size (d) and Zeta potential ($\xi$) of the ink were 26.6 mN/m, 3.16 cP, 155.2 nm and −37.4 mV, respectively. The textile samples were printed using an inkjet-printing machine and the UV-curable pigment ink made above. The samples then dried at 60° C. were irradiated with UV light (365 nm) for 40 s. The color rubbing fastness was presented in Table 1.

TABLE 1

The color rubbing fastness of the 4 samples prepared in the above 4 examples

| Samples | Dry rubbing fastness/Grade | Wet rubbing fastness/Grade |
| --- | --- | --- |
| Example 1 | 4-5 | 4 |
| Example 2 | 4-5 | 4-5 |
| Example 3 | 4-5 | 4 |
| Example 4 | 4-5 | 4-5 |

While the present invention has been described in some detail for purposes of clarity and understanding, one skilled in the art will appreciate that various changes in form and detail can be made without departing from the true scope of the invention. All figures, tables, appendices, patents, patent applications and publications, referred to above, are hereby incorporated by reference.

What is claimed is:
1. A method of preparing UV-curable inkjet pigment ink, comprising the steps of:
   a, mixing 30-60% (w/w) UV-curable pigment paste, 10-50% (w/w) water-soluble co-solvent, 0.5-5% (w/w) surfactant and deionized water at 500-1000 rpm for 10-60 minutes;
   b, adjusting pH value of the mixture to 8-10; and
   c, filtering the mixture through a 500 nm pore-size filtering sieve to obtain the UV-curable inkjet pigment ink, wherein said UV-curable pigment paste is prepared by miniemulsion polymerization as follows:

i. Preparation of phase A: 30-150% (w/w: monomer/pigment) monomer, 0.1-5% (w/w: co-emulsifier/monomer) co-emulsifier, 0.1-5% thermal initiator (w/w: thermal initiator/monomer), and 0.1-5% (w/w: photo initiator/monomer) photo initiator are mixed to obtain phase A;

ii. Preparation of phase B: 10-50% (w/w: pigment/UV-curable pigment paste) pigment, 10-50% (w/w: dispersant/monomer) dispersant and water, which is used to makes up to 100% UV-curable pigment paste, are mixed to obtain phase B; and iii. Preparation of the UV-curable pigment paste: the phase A is added dropwisely into phase B under mechanical stirring to get a coarse emulsion; secondly, the coarse emulsion is homogenized for 10-120 minutes to prepare a miniemulsion with particle size of 50-500 nm; thirdly, the miniemulsion is placed in a container, in which the air has been replaced by nitrogen, and allowed to react for 1-24 hours at 60-80° C. with continuous stirring (250-600 rpm); finally, the reaction product is filtered through a 500 nm pore size filtering sieve to obtain the UV-curable pigment paste.

2. The method of claim 1, wherein said pigment is one or more types of pigments selected from the group consisting of Carbon black, C. I. Pigment Yellow 1, C. I. Pigment Yellow 3, C. I. Pigment Yellow 12, C. I. Pigment Yellow 13, C. I. Pigment Yellow 14, C. I. Pigment Yellow 34, C. I. Pigment Yellow 36, C. I. Pigment Yellow 65, C. I. Pigment Yellow 74, C. I. Pigment Yellow 81, C. I. Pigment Yellow 83, C. I. Pigment Orange 13, C. I. Pigment Orange 16, C. I. Pigment Orange 34, C. I. Pigment Red 3, C. I. Pigment Red 8, C. I. Pigment Red 21, C. I. Pigment Red 7, C. I. Pigment Red 23, C. I. Pigment Red 38, C. I. Pigment Red 48:2, C. I. Pigment Red 48:4, C. I. Pigment Red 49:1, C. I. Pigment Red 52:2, C. I. Pigment Red 57:1, C. I. Pigment Red 63:1, C. I. Pigment Red 64:1, C. I. Pigment Red 81, C. I. Pigment Red 88, C. I. Pigment Red 92, C. I. Pigment Red 101, C. I. Pigment Red 104, C. I. Pigment Red 105, C. I. Pigment Red 106, C. I. Pigment Red 108, C. I. Pigment Red 112, C. I. Pigment Red 122, C. I. Pigment Red 123, C. I. Pigment Red 146, C. I. Pigment Red 149, C. I. Pigment Red 166, C. I. Pigment Red 168, C. I. Pigment Red 170, C. I. Pigment Red 172, C. I. Pigment Red 185, C. I. Pigment Red 190, C. I. Pigment Red 209, C. I. Pigment Red 219, C. I. Pigment Blue 1, C. I. Pigment Blue 15:1, C. I. Pigment Blue 15:3, C. I. Pigment Blue 15:4, C. I. Pigment Blue 15:6, C. I. Pigment Blue 16, C. I. Pigment Blue 17:1, C. I. Pigment Blue 56, C. I. Pigment Blue 61, C. I. Pigment Blue 63 and C. I. Pigment Purple 19.

3. The method of claim 1, wherein said monomer is one or two chemicals selected from the group consisting of butadiene, isoprene, dicyclopentadiene, styrene, butyl acrylate, ethyl acrylate, methyl acrylate, methyl methacrylate, ethyl methacrylate, butyl methacrylate, vinyl acetate, methyl vinyl ether and acrylonitrile.

4. The method of claim 1, wherein said thermal initiator is selected from the group consisting of azobisisobutyronitrile, benzoperoxide, tert-butyl hydroperoxide and tert-butyl perbenzoa.

5. The method of claim 1, wherein said photo initiator is selected from the group consisting of 1-hydroxy phenylcyclohexyl ketone, 2-methyl-1-[4-(methylthio)phenyl]-2-morpholinopropanone, isopropylphenyl-2-hydroxy-2-methylacetone, 2-hydroxy-2-methyl-1-phenyl-1-acetone and diphenyl (2,4,6-trimethylbenzoyl)phosphine oxide.

6. The method of claim 1, wherein said dispersant is selected from anion surfactant, non-ionic surfactant or reactive surfactant.

7. The method of claim 6, wherein said anion surfactant is selected from sodium dodecyl sulfate, sodium dodecyl sulfonate, sodium dodecyl benzene sulfonate, potassium oleate, sodium alkylnaphthalenesulfonate, or sodium abietate.

8. The method of claim 6, wherein said non-ionic surfactant is selected from polyoxyethylene alkyl phenol condensates, polyoxyethylene fatty alcohol condensates, polyoxyethylene polyol ether fatty acid ester or fatty acid polyoxyethylene condensates.

9. The method of claim 6, wherein said reactive surfactant is ammonium sulfateallyloxy nonylphenoxy poly(ethyleneoxy) (10) ether (DNS-86).

10. The method of claim 1, wherein said co-emulsifier is one or more chemicals selected from the group consisting of hexadecane, acetyl alcohol, solvothermal, octadecanethiol, hydrophobic alkyl resin, vinylsiloxane rubber, twelve alkyl esters of methacrylic acid, octadecyl methacrylate, polyvinyl acetate, polystyrene and poly(methyl methacrylate).

11. The method of claim 1, wherein said water-soluble co-solvent is one or more chemicals selected from the group consisting of ethanol, n-propyl alcohol, isopropanol, n-butyl alcohol, ethanediol, 1,3-propylene glycol, 1,4-butanediol, 1,6-hexanediol, diethylene glycol, triethyleneglycol, tetraethylene glycol, poly(ethylene glycol) 200, poly(ethylene glycol) 400, poly(ethylene glycol) 600, glycerol and pentaerythritol.

12. The method of claim 1, wherein said surfactant is one or more chemicals selected from the group consisting of polyoxyethylene alkyl ether, polyoxyethylene ester and polyoxyethylene alkyl phenol condensation compound.

\* \* \* \* \*